United States Patent Office 2,998,762
Patented Sept. 5, 1961

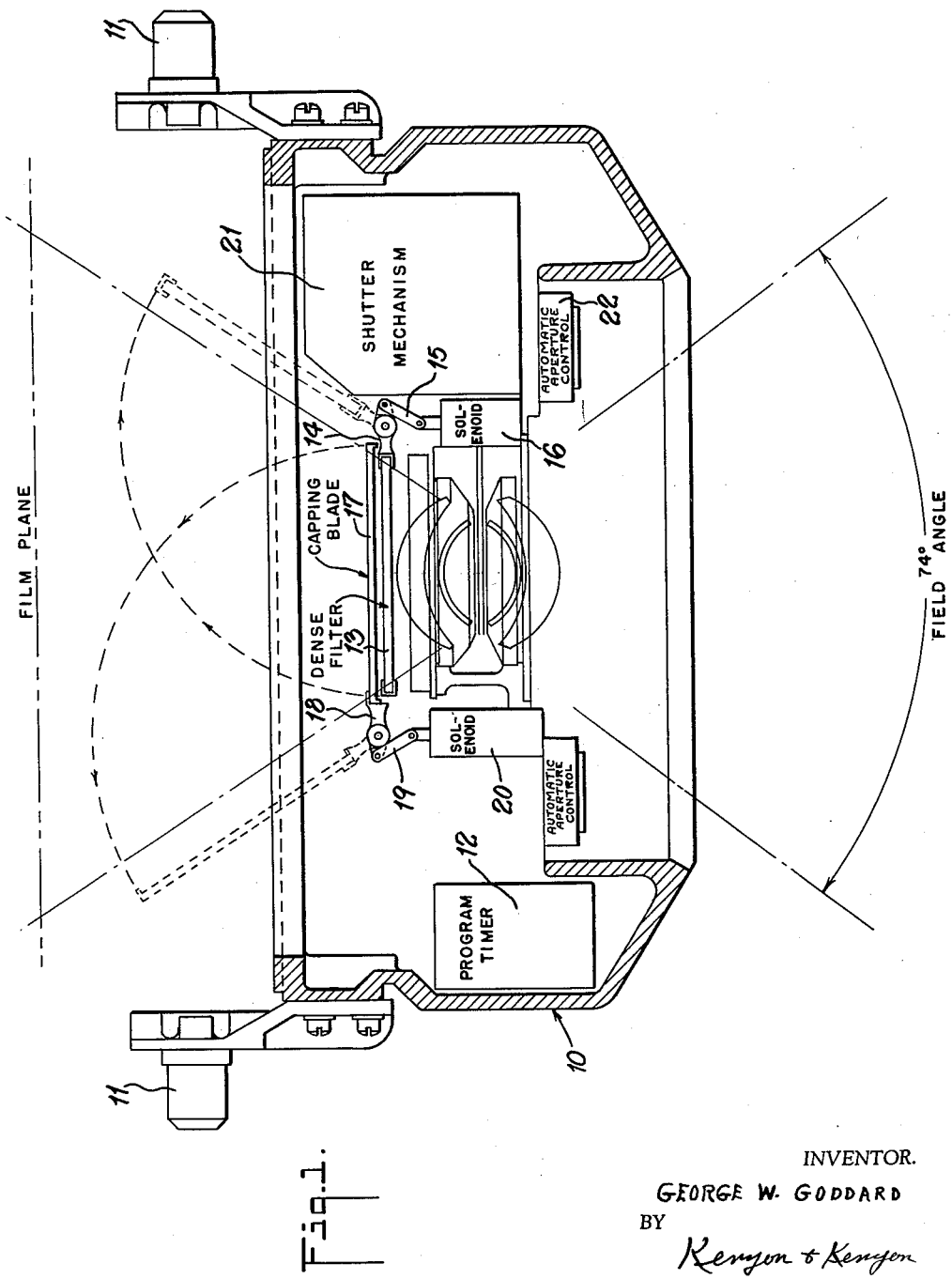

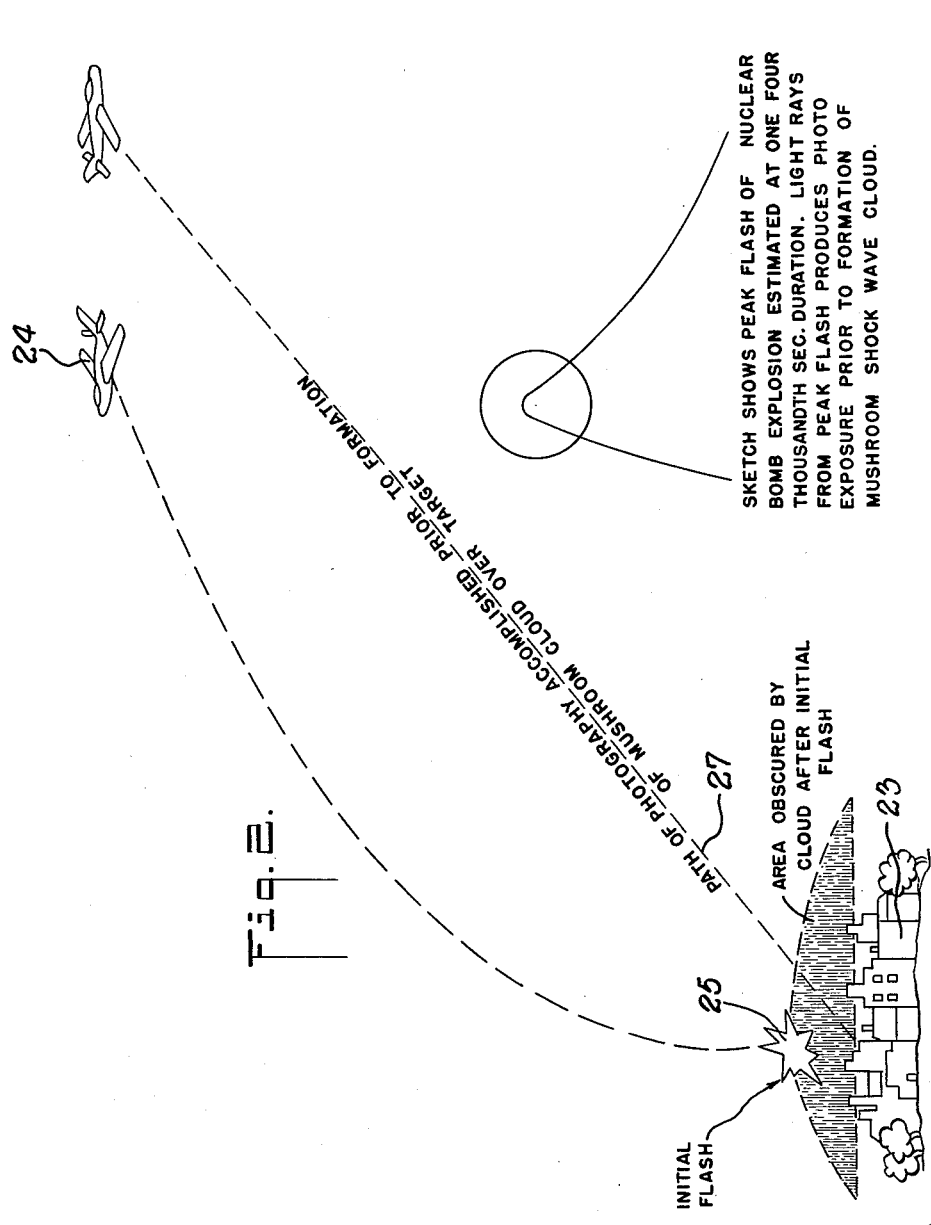

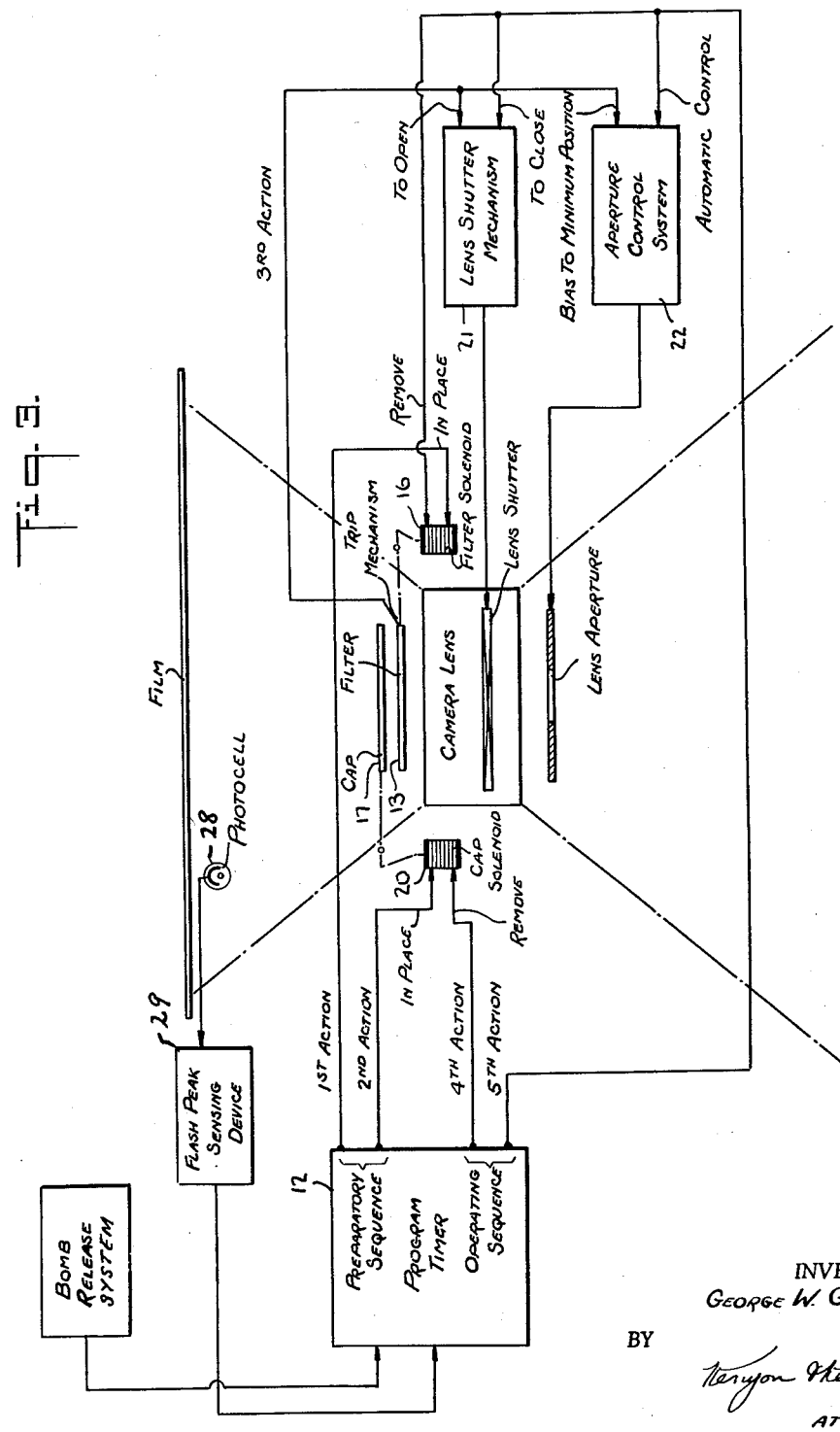

2,998,762
AERIAL AND GROUND PHOTOGRAPHIC EQUIPMENT FOR PHOTOGRAPHING NUCLEAR BOMB EXPLOSIONS WITH AUTOMATICALLY CONTROLLED INTERVAL FILTER AND APERTURE SETTINGS
George W. Goddard, Chevy Chase, Md., assignor to Bulova Research and Development Laboratories, Inc., Woodside, N.Y., a corporation of New York
Filed Aug. 20, 1956, Ser. No. 605,051
5 Claims. (Cl. 95—12.5)

The present invention relates generally to military photography and more particularly to photographic apparatus adapted to automatically record nuclear bomb explosions prior to the formation of a shock wave cloud.

In previous warfare, strike assessment photography was carried out by means of cameras installed either within the bombing aircraft or in other aircraft involved in that same mission. Bomb damage assessment was usually accomplished some time after the bombing mission, when the atmosphere had cleared sufficiently to provide a reasonably clear view of the target area. By comparison to nuclear bombs, the heaviest of explosives used during World War II were distinctly localized in their destructive effects, characteristic of relatively short destructive radius. Large area bombing was effected by use of many aircraft per target, each loaded with many bombs, and used in salvo or stick drop in an effort to build up the destructive radius.

Within the scope of the strategic mission it was then still possible to perform the photographic recording of the effects of the strike. Detail bomb damage assessment (BDA), which followed subsequently, involved photography of the target areas at rather substantial photographic scale (1:10,000 or greater) in an effort to provide ground detail at an image scale adequate for accurate and rapid interpretation.

The new nuclear environment is capable of measuring the destructive radius, not in terms of yards but in miles. In addition to the tremendous increase in lethal radius of nuclear weapons, the nature of the after-effects of such detonations renders the skies, in the vicinity of the bombed area, untenable for use of conventional strike and bomb damage assessment techniques. Modern aircraft vehicles have provided substantial gains in speed range and altitude capabilities, consonant with this new environment. On the other hand, photographic techniques have not kept abreast of the recording requirements for the modern mission.

Accordingly, the principal object of this invention is to provide a fully automatic photographic system adapted to record nuclear explosions, the operation of the system being integrated with the bomb drop procedure.

More particularly, the object of this invention is to provide a photographic system for aerial or ground installations having automatically controlled interval filter and aperture settings. It is possible with the invention, using a single camera, to photograph completely all sequences of a nuclear explosion with the correct combination of exposure filters and aperture settings.

For a better understanding of the invention as well as other objects and further features thereof, reference is had to the following detailed description to be read in connection with the accompanying drawing wherein:

FIG. 1 is a cross-sectional view of a camera system in accordance with the invention.

FIG. 2 is a sketch illustrative of the location and relationship of the various components involved to produce the operating cycle in accordance with the invention.

FIG. 3 is a schematic diagram illustrative of the operation of the camera system.

Referring now to FIG. 1, there is shown an aerial camera, generally designated by numeral 10, which is mounted on suitable trunnions 11, whereby the camera may be angularly oriented, as desired.

The camera is normally mounted in an aft position on the aircraft such that the lens field angle is that of a high, rear shooting oblique. A 6 inch focal length metrogon lens will, in such location provide a field coverage of some 74° both horizontally and vertically. This wide angle coverage will amply cover the field which includes the impact point, despite angular positional changes that the bombing aircraft may make in evasive maneuvers following the bomb drop.

It is to be understood that while an aerial installation is described herein by way of illustration, the invention is also applicable to ground photographic installations.

The camera includes a program timer 12 which acts to control a cycle of operations. The aerial system is initiated by means of a pulse or other control signal from the bomb release mechanism on the plane, which in turn triggers the camera program timer 12. The lens port of the camera is covered by a heavy density optical filter 13 mounted on a rocker arm 14 which is pivotally coupled by a link member 15 to the armature of a solenoid 16, such that when the solenoid is energized the filter 13 is raised, as indicated in dotted lines, to uncover the lens port.

Also included is an opaque capping plate 17 which closes over the filter assembly, the capping plate being mounted on a rocker arm 18 which is pivotally coupled by a link 19 to a solenoid 20. When solenoid 20 is energized, the plate 17 is raised to expose the filter, the raised position being indicated in dotted lines in the figure. A between the lens shutter mechanism 21 is provided as well as an automatic aperture control 22.

In operation (note FIG. 3), when the camera program timer 12 is triggered by the bomb release mechanism, the following cycle of sequential operations is set off:

(A) The heavy density filter 13 closes over the lens port.

(B) The opaque capping plate 17 closes over the filter assembly.

(C) The filter 13, upon closing, trips the lens shutter 21 to its open position and impresses a bias across the aperture control servo motor, causing it to drive the diaphragm to its minimum aperture position.

(D) The automatic aperture control 22 is at this point held inoperative (override by C).

In practice these operations take place within a period of two seconds after bomb release (zero time) and place the photographic system in its Ready position. The timer continues to operate to effect the following sequence.

Assuming for the moment a sixty second drop time, the program timer 12 then at approximately 57 seconds after the time of bomb release, releases the opaque capping plate 17 which is used merely to prevent pre-exposure with shutter in open position. The dense filter is now still in the optical path.

At the time of detonation, the intense flash which precedes the burst is sensed by a small photocell assembly 28 in the focal plane area behind the dense filter 13, with the shutter still in the Open position. The bomb flash detected by photocell 28 is applied to a flash "peak" sensing unit 29 and then initiates the following cycle of operations:

(1) The signal from "peak" sensing photocell unit is fed to the timer 12.

(2) The timer releases the shutter 21 thereby completing the first exposure, at which point the dense filter 13 is removed and automatic aperture control is then governed by ambient light.

(3) The camera continues to operate at a rate of 2 exposures per second.

(4) The automatic aperture control then acts to adjust to prevailing light levels (toward larger aperture) as the flash phenomenon subsides to normal ambient illumination.

(5) The camera operates for a period of 10 seconds after detonation time, and at a rate of two exposures per second.

(6) At the end of this cycle, the timer then opens the camera drive circuit, with camera ready for the next sequence.

(7) Timer resets and stops.

The sequential operation of the camera system as described, is fully automatic once airborne and completely independent of a need for human operators. Prior to actual bomb drop and while aircraft is en route to the target, conventional overlapping photographs can be made to check the course of the aircraft to the target area. The program timer is designed for variable settings of the Ready-Operate functions thereby allowing that modicum of flexibility for a variety of missions. These ground settings may be accomplished in a manner of seconds prior to take-off, providing thereby a desirable short aircraft ready time.

Variations in altitude, which affect the bomb drop time may be sensed by an aneroid diaphragm device which for increasing altitude automatically increases the timer delay setting. In this fashion, bombing altitudes different from those initially planned for the mission, may be corrected accurately and instantaneously.

FIG. 2 shows the location and relationship of the various components involved to produce the operating cycle previously described. The ground target 23 is struck by a nuclear bomb dropped from a plane 24, the star 25 representing the initial flash and the shaded area 26 indicating the area obscured by the cloud after the initial flash. The peak flash of a nuclear bomb is estimated to be of one four-thousandth of a second duration. Light rays from the peak flash produces the photographic exposure prior to the formation of a mushroom shock cloud. The straight line path of photography accomplished prior to the formation of the mushroom cloud is indicated by dashed line 27.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. An automatic control system for a camera adapted to photograph a nuclear bomb explosion, said camera including a lens, a shutter therefor, a heavy-density optical filter adapted to cover the lens, and an opaque capping plate adapted to cover the filter, said system comprising a program timer operatively coupled to said lens shutter, said filter and said capping plate, means to trigger said timer upon release of the bomb to effect a first preparatory sequence rendering said camera ready whereby said lens is covered by said filter, said filter is capped by said plate and said shutter is open, said program timer then effecting a second operating sequence commencing a predetermined interval after said bomb is released whereby said capping plate is removed to expose said lens through said filter, and photosensitive and other means responsive to the peak flash of the bomb explosion to release the shutter and thereby complete a first exposure.

2. An automatic control system for a camera adapted to photograph a nuclear bomb explosion, said camera including a lens, a shutter therefor, a heavy density optical filter adapted to cover the lens, and an opaque capping plate adapted to cover the filter, said system comprising a program timer operatively coupled to said lens shutter, said filter and said capping plate, means to trigger said timer upon release of the bomb to effect a first preparatory sequence rendering said camera ready whereby said lens is covered by said filter, said filter is capped by said plate and said shutter is open, said timer then effecting a second operating sequence commencing a predetermined interval after said bomb is released whereby said capping plate is removed to expose said lens through said filter, means responsive to the peak flash of the bomb explosion to release the shutter and thereby complete a first exposure, said timer subsequently acting to remove said filter and to take a second exposure without said filter.

3. An automatic system for photographing bomb explosions comprising a camera provided with a lens for optically projecting the scene to be photographed onto a film, a shutter for said lens, a heavy-density optical filter interposed between said lens and said film and adapted to mask the lens and an opaque capping device adapted to cover said filter; and a control system for said camera including a program timer operatively coupled to said lens shutter, said filter and said capping device, and means to initiate operation of said timer upon launching of a bomb to effect a first preparatory sequence in which said lens is masked by said filter, said filter is capped by said device and said lens shutter is then caused to open, said program timer being provided with a timing mechanism to effect a second operating sequence commencing a predetermined interval after said bomb is launched to cause removal of said capping device to expose said filter whereby the scene to be photographed is projected onto said film through both said lens and said filter, and photosensitive means responsive to the peak flash of the bomb explosion to effect closure of said lens shutter thereby completing a first exposure.

4. A system as set forth in claim 3 wherein said timer is provided with means acting at the termination of said operating sequence to remove said filter from said lens and to reopen said shutter to take a second exposure without said filter.

5. A system as set forth in claim 3 further including an adjustable aperture for said lens and an automatic aperture control mechanism operatively coupled to said filter to maintain a small aperture during said first exposure when said filter covers the lens and responsive to said program timer to provide a larger aperture during subsequent exposure when said filter is removed.

References Cited in the file of this patent

UNITED STATES PATENTS

| | | |
|---|---|---|
| 1,844,180 | Rennick | Feb. 9, 1932 |
| 2,283,788 | Briechle | May 19, 1942 |
| 2,353,898 | Nitsch | July 18, 1944 |
| 2,393,575 | Steiner | Jan. 22, 1946 |
| 2,399,476 | Doyle | Apr. 30, 1946 |
| 2,485,119 | Steiner | Oct. 18, 1949 |
| 2,575,020 | Lee | Nov. 13, 1951 |
| 2,683,402 | Bruck | July 13, 1954 |
| 2,713,814 | Sonne | July 26, 1955 |
| 2,764,072 | Walsh | Sept. 25, 1956 |

UNITED STATES PATENT OFFICE

CERTIFICATE OF CORRECTION

Patent No. 2,998,762                          September 5, 1961

George W. Goddard

It is hereby certified that error appears in the above numbered patent requiring correction and that the said Letters Patent should read as corrected below.

Column 2, line 51, for "Ready" read -- READY --; line 63, for "Open" read -- OPEN --; column 3, line 21, for "Ready-Operate" read -- READY-OPERATE --; line 23, for "manner" read -- matter --.

Signed and sealed this 27th day of March 1962.

(SEAL)
Attest:

ERNEST W. SWIDER                              DAVID L. LADD
Attesting Officer                                 Commissioner of Patents